US012774992B2

(12) United States Patent
Peng et al.

(10) Patent No.: US 12,774,992 B2
(45) Date of Patent: Oct. 27, 2026

(54) MATERIAL RECOGNITION SYSTEM AND METHOD

(71) Applicant: Delta Electronics, Inc., Taoyuan City (TW)

(72) Inventors: Chia-Ju Peng, Taoyuan City (TW); Po-Yu Cheng, Taoyuan City (TW); Po-Kai Huang, Taoyuan City (TW); Wei-Cheng Tian, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 443 days.

(21) Appl. No.: 18/494,222

(22) Filed: Oct. 25, 2023

(65) Prior Publication Data

US 2025/0035593 A1 Jan. 30, 2025

(30) Foreign Application Priority Data

Jul. 27, 2023 (CN) ........................ 202310932797.8

(51) Int. Cl.
*G01N 29/44* (2006.01)

(52) U.S. Cl.
CPC ..... *G01N 29/4436* (2013.01); *G01N 29/4481* (2013.01)

(58) Field of Classification Search
CPC ...... G01N 29/07; G01N 29/46; G01N 29/225; G01N 29/4436; G01N 29/4481
USPC ........................................................... 702/39
See application file for complete search history.

(56) References Cited

U.S. PATENT DOCUMENTS

2023/0095525 A1 3/2023 Kalariya et al.

FOREIGN PATENT DOCUMENTS

| | | | |
|---|---|---|---|
| CN | 103454288 | A | 12/2013 |
| TW | I482956 | B | 5/2015 |
| TW | 202142866 | A | 11/2021 |

(Continued)

OTHER PUBLICATIONS

Chen et al. , TW202321687A, "Object-gripping system using ultrasonic recognition and method thereof", Date Published: Jun. 1, 2023, English translation (Year: 2023).*

(Continued)

*Primary Examiner* — John H Le
(74) *Attorney, Agent, or Firm* — MUNCY, GEISSLER, OLDS & LOWE, P.C.

(57) ABSTRACT

An embodiment of the invention provides a material recognition system. The material recognition system may include a fetching device, at least one sensing device and a processing device. The fetching device may fetch a target object. Each sensing device may include an ultrasound transmitter and an ultrasound receiver. The ultrasound transmitter may transmit an ultrasound emitting signal on the surface of the target object. The ultrasound receiver may receive an ultrasound received signal on the surface of the target object. There is a fixed distance between the ultrasound transmitter and the ultrasound receiver. The processing device may recognize the material of the target object according to the ultrasound emitting signal, the ultrasound received signal, and the fixed distance. In addition, when the fetching device fetches the target object, the ultrasound transmitter and the ultrasound receiver touch the surface of the target object.

14 Claims, 5 Drawing Sheets

(56) References Cited

FOREIGN PATENT DOCUMENTS

| | | | |
|---|---|---|---|
| TW | I794281 | B | 3/2023 |
| TW | 202321687 | A | 6/2023 |

OTHER PUBLICATIONS

Ann Office Action for TW Application No. 112128117, dated Jul. 22, 2024 is attached, 6 pages.

* cited by examiner

MATERIAL RECOGNITION SYSTEM AND METHOD

CROSS REFERENCE TO RELATED APPLICATIONS

This application claims priority of China Patent Application No. 202310932797.8 filed on Jul. 27, 2023, the entirety of which is incorporated by reference herein.

BACKGROUND OF THE INVENTION

Field of the Invention

The invention generally relates to material recognition technology, and more particularly, to material recognition technology in which ultrasound signals on the surface of a target object are used to recognize the material of the target object.

Description of the Related Art

As technology continues to progress, the viable applications for service robots and collaborative robots (cobots) are becoming more and more widespread.

For example, a cobot (e.g., a robot arm) may be used to fetch a target object, as well as to provide different services. When the cobot fetches the target object, the cobot may use an image recognition algorithm to obtain the appearance and color of the target object to recognize the target object, or it may use a force sensor to obtain the hardness of the target object to recognize the target object.

However, when the appearance and color of the target object are hard to recognize (for example, if the target object is transparent), it will be harder for the cobot to recognize the target object. In addition, because the cobot does not know the material of the target object, a particularly delicate target object may break when the cobot puts pressure on it to determine its hardness.

Therefore, how to more accurately and rapidly recognize a target object is a topic that is worthy of discussion.

BRIEF SUMMARY OF THE INVENTION

A material recognition system and method are provided to overcome the problems mentioned above.

An embodiment of the invention provides a material recognition system. The material recognition system may include a fetching device, at least one sensing device and a processing device. The fetching device may be configured to fetch a target object. The sensing device may be configured in a fetching part of the fetching device. Each sensing device may include an ultrasound transmitter and an ultrasound receiver. The ultrasound transmitter may be configured to transmit an ultrasound emitting signal on the surface of the target object. The ultrasound receiver may be configured to receive an ultrasound received signal on the surface of the target object. There is a fixed distance between the ultrasound transmitter and the ultrasound receiver. The processing device may be coupled to the fetching device and the sensing device. The processing device may recognize the material of the target object according to the ultrasound emitting signal, the ultrasound received signal, and the fixed distance. In addition, when the fetching device fetches the target object, the ultrasound transmitter and the ultrasound receiver touch the surface of the target object.

In some embodiments, the processing device may further obtain ultrasound transmission speed information according to the ultrasound emitting signal, the ultrasound received signal, and the fixed distance.

In some embodiments, the processing device may further recognize the material of the target object according to the ultrasound transmission speed information and a look-up table.

In some embodiments, the processing device may further obtain time-domain information and frequency-domain information of the ultrasound emitting signal and the ultrasound received signal, and input the ultrasound transmission speed information and ultrasound features corresponding to the time-domain information and the frequency-domain information into a machine learning model to recognize the material of the target object.

In some embodiments, the processing device may further indicate the ultrasound features according to the time-domain information and the frequency-domain information of the ultrasound emitting signal and the ultrasound received signal, wherein the ultrasound features may comprise impedance value, attenuation value, distortion value and complexity of the ultrasound emitting signal and the ultrasound received signal.

In some embodiments, the ultrasound transmitter and the ultrasound receiver may be configured in parallel in the sensing device.

In some embodiments, the ultrasound transmitter and the ultrasound receiver may be stuck flatly to the surface of the target object.

In some embodiments, a first sensing device may be configured in the first side of the fetching part of the fetching device, and a second sensing device is configured in the second side of the fetching part of the fetching device.

In some embodiments, the sensing device may further comprise a pressure sensor to determine whether the ultrasound transmitter and the ultrasound receiver have touched the surface of the target object.

In some embodiments, the fetching device may be a robot arm, a chuck device, a probe device, or a gripper device.

An embodiment of the invention provides a material recognition method. The material recognition method may be applied to a material recognition system. The material recognition method may include the following steps. A fetching device of the material recognition system may fetch a target object. Then, an ultrasound transmitter of at least one sensing device of the material recognition system may transmit an ultrasound emitting signal on the surface of the target object. Then, an ultrasound receiver of said sensing device may receive an ultrasound received signal on the surface of the target object, where when the fetching device fetches the target object, the ultrasound transmitter and the ultrasound receiver touch the surface of the target object and there is a fixed distance between the ultrasound transmitter and the ultrasound receiver. Then, a processing device of the material recognition system may recognize the material of the target object according to the ultrasound emitting signal, the ultrasound received signal, and the fixed distance.

Other aspects and features of the invention will become apparent to those with ordinary skill in the art upon review of the following descriptions of specific embodiments of a material recognition system and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
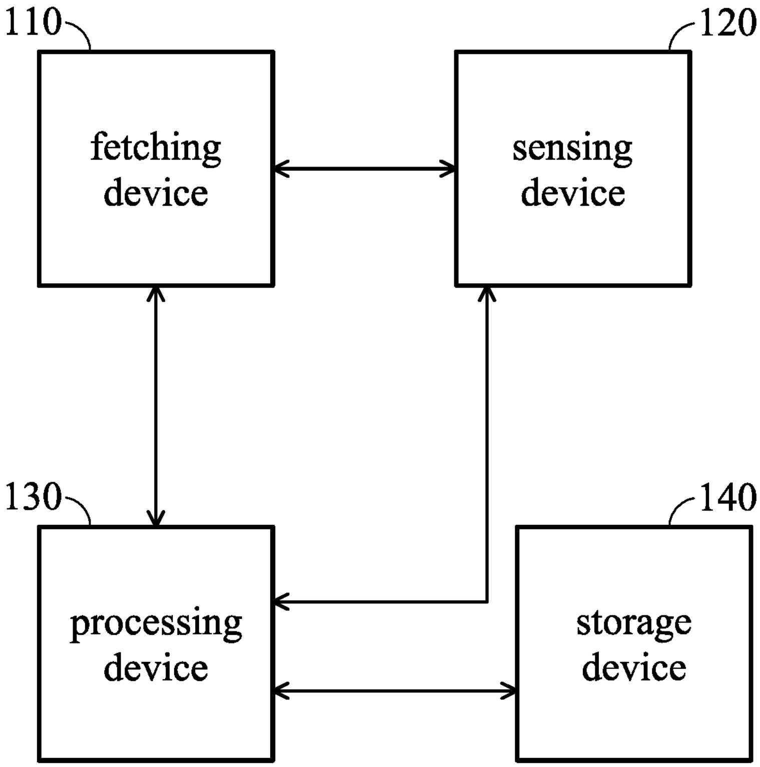
FIG. 1 is a block diagram of a material recognition system 100 according to an embodiment of the invention.

FIG. 1 is a block diagram of a material recognition system 100 according to an embodiment of the invention. As shown in FIG. 1, the material recognition system 100 may comprise a fetching device 110, at least one sensing device 120, processing device 130 and a storage device 140. It should be noted that FIG. 1 presents a simplified block diagram in which only the elements relevant to the invention are shown. However, the invention should not be limited to what is shown in FIG. 1. The material recognition system 100 may also comprise other devices.

According to an embodiment of the invention, the sensing device 120, processing device 130 and storage device 140 may be integrated into the fetching device. According to another embodiment of the invention, the sensing device 120 may be integrated into the fetching device 110, and the processing device 130 and the storage device 140 may be integrated into another device (e.g., a tablet, a desktop computer, a notebook, and so on).

According to an embodiment of the invention, the fetching device 110 may be a service robot or a collaborative robot (cobot or co-robot), e.g., a robot arm, a chuck device, a probe device, or a gripper device, but the invention should not be limited thereto. The fetching device 110 may be configured to fetch a target object 200. The fetching device 110 may comprise a body part and a fetching part (i.e., the end-effector of the fetching device 110).

According to an embodiment of the invention, the sensing device 120 may be configured in the fetching part of the fetching device 110. For example, if the fetching device 110 is a robot arm, the sensing device 120 may be configured in the gripper of the fetching device 110, and if the fetching device 110 is a chuck device, the sensing device 120 may be configured in the chuck of the fetching device 110.

According to an embodiment of the invention, the fetching part of the fetching device 110 may be configured one or more sensing device 120. For example, if the fetching device 110 is a robot arm, a sensing device 120 may be configured in one side of the gripper of the fetching device 110, and another sensing device 120 may be configured in the other side of the gripper of the fetching device 110.

Figure 2A:
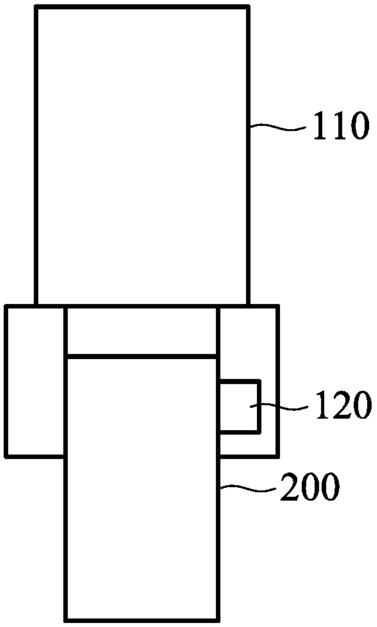
FIG. 2A is a schematic diagram illustrating a configuration of sensing device 120 according to an embodiment of the invention.

FIG. 2A is a schematic diagram illustrating a configuration of sensing device 120 according to an embodiment of the invention. As shown in FIG. 2A, if the fetching device 110 is a robot arm, only one sensing device 120 may be configured in one side of the gripper of the fetching device 110.

Figure 2B:
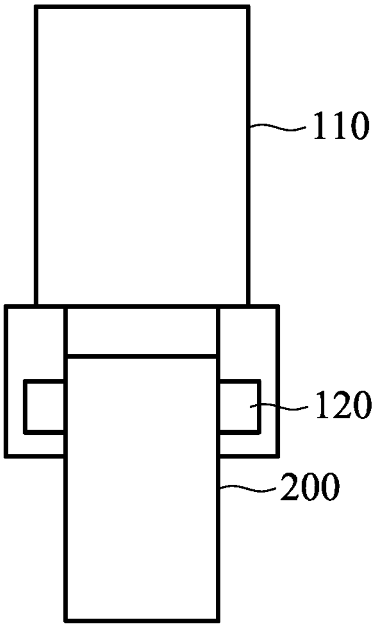
FIG. 2B is a schematic diagram illustrating a configuration of sensing device 120 according to another embodiment of the invention.

FIG. 2B is a schematic diagram illustrating a configuration of sensing device 120 according to another embodiment of the invention. As shown in FIG. 2B, if the fetching device 110 is a robot arm, one sensing device 120 may be configured in one side of the gripper of the fetching device 110, and another sensing device 120 may be configured in the other side of the gripper of the fetching device 110.

Figure 2C:
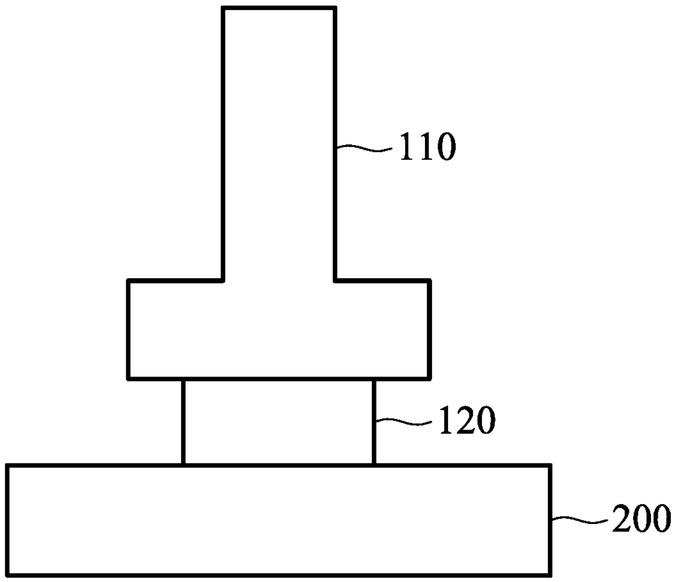
FIG. 2C is a schematic diagram illustrating a configuration of sensing device 120 according to another embodiment of the invention.

FIG. 2C is a schematic diagram illustrating a configuration of sensing device 120 according to another embodiment of the invention. As shown in FIG. 2C, if the fetching device 110 is a probe device, the sensing device 120 may be configured in the probe of the fetching device 110.

Figure 2D:
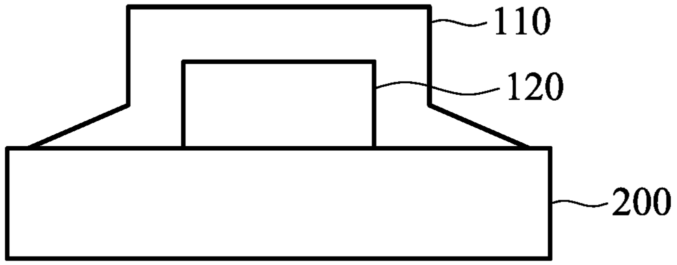
FIG. 2D is a schematic diagram illustrating a configuration of sensing device 120 according to another embodiment of the invention.

FIG. 2D is a schematic diagram illustrating a configuration of sensing device 120 according to another embodiment of the invention. As shown in FIG. 2D, if the fetching device 110 is a chuck device, the sensing device 120 may be configured in the chuck of the fetching device 110.

It should be noted that FIGS. 2A-2D are only used to illustrate the embodiments of the invention, but the invention should not be limited thereto. The configuration of the sensing device 120 can be appropriately adjusted based on the type of the fetching device 110.

Figure 3A:
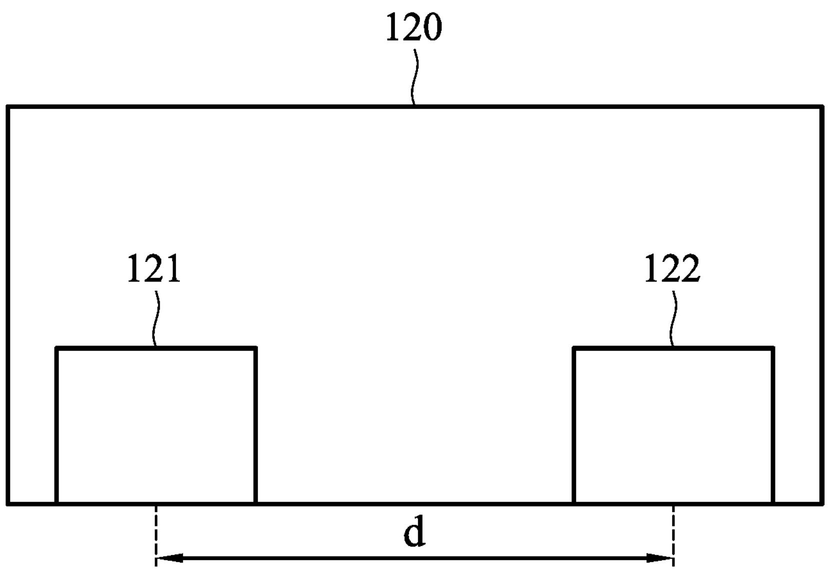
FIG. 3A is a schematic diagram illustrating a sensing device 120 according to an embodiment of the invention.

FIG. 3A is a schematic diagram illustrating a sensing device 120 according to an embodiment of the invention. As shown in FIG. 3A, according to an embodiment of the invention, the sensing device 120 may comprise an ultrasound transmitter 121 and an ultrasound receiver 122. There is a fixed distance d between the ultrasound transmitter 121 and the ultrasound receiver 122 of the sensing device 120. When the fetching device 110 fetches the target object 200, the ultrasound transmitter 121 and the ultrasound receiver 122 may touch the surface of the target object 200. The ultrasound transmitter 121 may be configured to transmit (or emit) an ultrasound emitting signal on the surface of the target object 200. The ultrasound receiver 122 may be configured to receiver an ultrasound received signal from the surface of the target object, wherein the ultrasound received signal corresponds to the ultrasound emitting signal from the ultrasound transmitter 121.

Figure 3B:
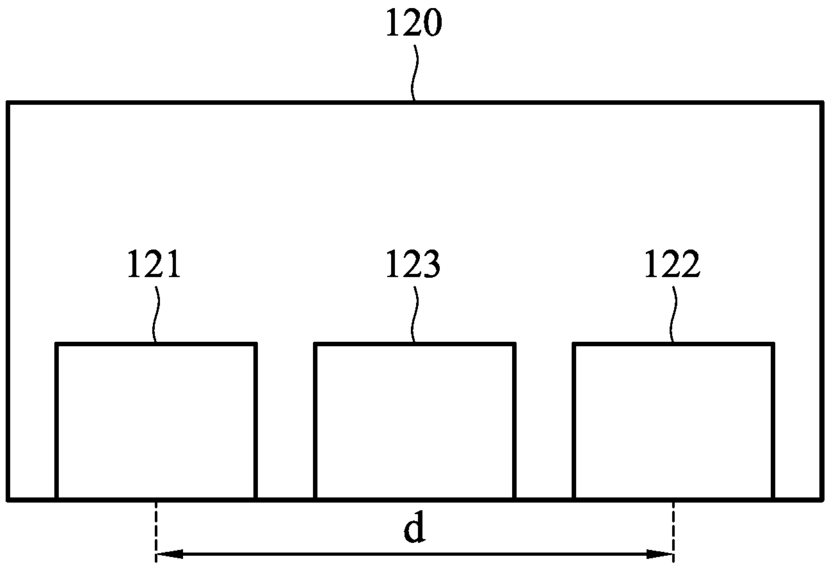
FIG. 3B is a schematic diagram illustrating a sensing device 120 according to another embodiment of the invention.

FIG. 3B is a schematic diagram illustrating a sensing device 120 according to another embodiment of the invention. As shown in FIG. 3B, according to an embodiment of the invention, the sensing device 120 may comprise an ultrasound transmitter 121, an ultrasound receiver 122 and a pressure sensor 123. The difference between FIG. 3B and FIG. 3A is that the sensing device 120 of FIG. 3B may be further configured the pressure sensor 123. When the fetching device 120 fetches the target object 200, the pressure sensor 123 may be configured to determine whether the ultrasound transmitter 121 and the ultrasound receiver 122 have touched the surface of the target object 200.

According to an embodiment of the invention, as shown is FIG. 3A and FIG. 3B, the ultrasound transmitter 121 and the ultrasound receiver 122 may be configured in parallel in the sensing device, but the invention should not be limited thereto. In addition, according to an embodiment of the invention, the ultrasound transmitter 121 and the ultrasound receiver 122 may be stuck flatly to the target object 200 to touch the surface of the target object 200, but the invention should not be limited thereto.

According to an embodiment of the invention, the ultrasound transmitter 121 and the ultrasound receiver 122 may also be independent devices, but there is still a fixed distance d between the ultrasound transmitter 121 and the ultrasound receiver 122.

According to an embodiment of the invention, the processing device 130 may be a controller or a processor. The processing device 130 may be configured to control the operations of the fetching device 110, the sensing device 120 and the storage device 140. According to an embodiment of the invention, the processing device 130 may perform the software program codes and firmware program codes to perform the operations of recognizing the material of the target object 200.

According to an embodiment of the invention, the storage circuit 140 may store the software and firmware program codes, system data, etc. of the processing device 130. The storage circuit 140 may be a volatile memory (e.g. Random Access Memory (RAM)), or a non-volatile memory (e.g. flash memory, Read Only Memory (ROM)), a hard disk, or a combination of the above memory devices. According to an embodiment of the invention, the storage device 140 may be configured to store a look-up table about the material information (e.g., ultrasound transmission speed information) corresponding to different materials (e.g., glass, plastic, metal, and so on). According to an embodiment of the invention, the storage device 140 may further store the data about the machine learning model or the deep learning model for the machine learning operations or deep learning operations.

According to an embodiment of the invention, when the fetching device 110 fetches the target object 200, the processing device 130 may obtain ultrasound transmission speed information corresponding to the target object 200 according to the ultrasound emitting signal from the ultrasound transmitter 121, the ultrasound received signal from the ultrasound receiver 122, and the distance d between the ultrasound transmitter 121 and the ultrasound receiver 122. Specifically, the processing device 130 may calculate the transmission time of the ultrasound signal on the material of the target object 200 according to the ultrasound emitting signal from the ultrasound transmitter 121 and the ultrasound received signal from the ultrasound receiver 122. Then, the processing device 130 may divide the distance d by the transmission time of the ultrasound signal on the material of the target object 200 to obtain the transmission speed of the ultrasound signal on the material of the target object 200 (i.e., the ultrasound transmission speed information corresponding to the target object 200).

According to an embodiment of the invention, the processing device 130 may recognize the material of the target object 200 according to the ultrasound transmission speed information corresponding to the target object 200 and the look-up table. For example, the look-up table may prerecord the transmission speeds corresponding to different materials. The processing device 130 may know the material of the target object 200 by looking up the look-up table.

According to another embodiment of the invention, the processing device 130 may further obtain the time-domain information and the frequency-domain information of the ultrasound emitting signal and the ultrasound received signal, and then, input the ultrasound transmission speed information corresponding to the target object 200 and the time-domain information and the frequency-domain information of the ultrasound emitting signal and the ultrasound received signal into a pre-trained machine learning model or deep learning model to recognize the material of the target object 200.

Specifically, the processing device 130 may indicate the ultrasound features on the surface of the target object 200 according to the time-domain information and the frequency-domain information of the ultrasound emitting signal and the ultrasound received signal. The ultrasound features may comprise impedance value, attenuation value, distortion value, complexity, and so on, but the invention should not be limited thereto. Then, the processing device 130 may input the ultrasound transmission speed information corresponding to the target object 200 and input the ultrasound features corresponding to the time-domain information and the frequency-domain information of the ultrasound emitting signal and the ultrasound received signal into a pre-trained machine learning model or deep learning model to recognize the material of the target object 200.

According to an embodiment of the invention, the time-domain information may comprise a root-mean-square (RMS) level, a waveform envelope, a zero-crossing rate, a sample entropy, but the invention should not be limited thereto. According to an embodiment of the invention, the frequency-domain information may comprise a Hilbert-Huang transform (HHT) marginal spectrum, but the invention should not be limited thereto. In an embodiment, the processing device 130 may indicate an impedance value corresponding to the ultrasound signals according to the RMS level of the ultrasound emitting signal and the ultrasound received signal. In another embodiment, the processing device 130 may indicate an attenuation value corresponding to the ultrasound signals according to the waveform envelope and the zero-crossing rate of the ultrasound emitting signal and the ultrasound received signal. In another embodiment, the processing device 130 may indicate a distortion value and a complexity corresponding to the ultrasound signals according to the HHT marginal spectrum of the ultrasound emitting signal and the ultrasound received signal.

According to an embodiment of the invention, the machine learning model or the deep learning model may comprise a decision tree, a support vector machine (SVM), a deep belief network (DBN), K-nearest neighbor, or convolutional neural network (CNN), but the invention should not be limited thereto.

When the processing device 130 knows the material of the target object 200, the accuracy of recognizing the target object will be increased.

Figure 4:
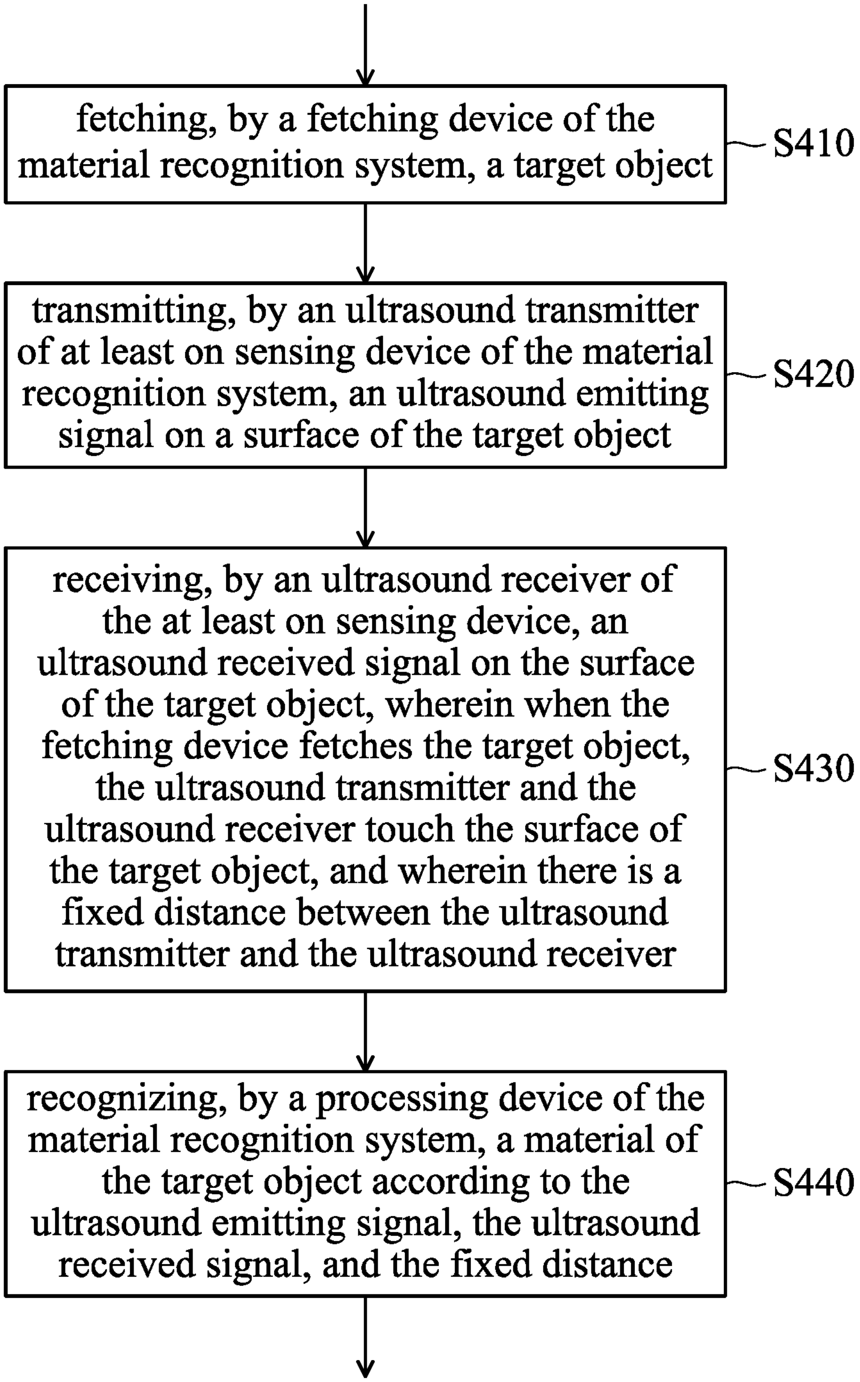
FIG. 4 is a flow chart illustrating a material recognition method according to an embodiment of the invention.

FIG. 4 is a flow chart illustrating a material recognition method according to an embodiment of the invention. The material recognition method can be applied to the material recognition system 100. As shown in FIG. 4, in step S410, a fetching device of the material recognition system 100 may fetch a target object.

In step S420, an ultrasound transmitter of at least one sensing device of the material recognition system 100 may transmit an ultrasound emitting signal on the surface of the target object.

In step S430, an ultrasound receiver of at least one sensing device of the material recognition system 100 may receive an ultrasound received signal on the surface of the target object. In the material recognition method, when the fetching device fetches the target object, the ultrasound transmitter and the ultrasound receiver may touch the surface of the target object, and there is a fixed distance between the ultrasound transmitter and the ultrasound receiver.

In step S440, a processing device of the material recognition system 100 may recognize the material of the target object according to the ultrasound emitting signal, the ultrasound received signal, and the fixed distance.

According to an embodiment of the invention, in the material recognition method, the processing device of the material recognition system 100 may further obtain the ultrasound transmission speed information corresponding to the target object according to the ultrasound emitting signal, the ultrasound received signal, and the fixed distance.

According to an embodiment of the invention, in the material recognition method, the processing device of the material recognition system 100 may further recognize the material of the target object according to ultrasound transmission speed information and a look-up table.

According to an embodiment of the invention, in the material recognition method, the processing device of the material recognition system 100 may further obtain the time-domain information and the frequency-domain information of the ultrasound emitting signal and the ultrasound received signal. Then, the processing device of the material recognition system 100 may input the ultrasound transmission speed information and the ultrasound features of the time-domain information and the frequency-domain information into a machine learning model to recognize the material of the target object.

According to an embodiment of the invention, in the material recognition method, the processing device of the material recognition system 100 may indicate the ultrasound features according to the time-domain information and the frequency-domain information of the ultrasound emitting signal and the ultrasound received signal. The ultrasound features may comprise impedance value, attenuation value, distortion value and complexity of the ultrasound emitting signal and the ultrasound received signal.

According to an embodiment of the invention, in the material recognition method, the ultrasound transmitter and the ultrasound receiver may be configured in parallel in the sensing device.

According to an embodiment of the invention, in the material recognition method, the ultrasound transmitter and the ultrasound receiver may be stuck flatly to the surface of the target object.

According to an embodiment of the invention, in the material recognition method, a first sensing device may be configured in a first side of the fetching part of the fetching device of the material recognition system 100, and a second sensing device may be configured in a second side of the fetching part of the fetching device of the material recognition system 100.

According to an embodiment of the invention, in the material recognition method, the sensing device may further comprise a pressure sensor to determine whether the ultrasound transmitter and the ultrasound receiver have touched the surface of the target object.

According to an embodiment of the invention, in the material recognition method, the fetching device may be a robot arm, a chuck device, a probe device, or a gripper device.

According to the material recognition method provided in the invention, the signal features of the ultrasound signals transmitted on the surface of the target object can be used to recognize the material of the target object. Therefore, the accuracy of recognizing the target object will be increased.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A material recognition system, comprising:

a fetching device, configured to fetch a target object;

at least one sensing device, configured in a fetching part of the fetching device, wherein the sensing device comprises:

an ultrasound transmitter, transmitting an ultrasound emitting signal on a surface of the target object; and an ultrasound receiver, receiving an ultrasound received signal on the surface of the target object, wherein there is a fixed distance between the ultrasound transmitter and the ultrasound receiver; and a processing device, coupled to the fetching device and the at least one sensing device, and recognizing a material of the target object according to the ultrasound emitting signal, the ultrasound received signal, and the fixed distance, wherein when the fetching device fetches the target object, the ultrasound transmitter and the ultrasound receiver touch the surface of the target object, wherein the processing device further obtains ultrasound transmission speed information according to the ultrasound emitting signal, the ultrasound received signal, and the fixed distance, wherein the processing device further obtains time-domain information and frequency-domain information of the ultrasound emitting signal and the ultrasound received signal, and inputs the ultrasound transmission speed information and ultrasound features corresponding to the time-domain information and the frequency-domain information into a machine learning model to recognize the material of the target object, and wherein the processing device further indicates the ultrasound features according to the time-domain information and the frequency-domain information of the ultrasound emitting signal and the ultrasound received signal, wherein the ultrasound features comprise an impedance value, an attenuation value, a distortion value, and a complexity of the ultrasound emitting signal and the ultrasound received signal.

2. The material recognition system of claim 1, wherein the processing device further recognizes the material of the target object according to the ultrasound transmission speed information and a look-up table.

3. The material recognition system of claim 1, wherein the ultrasound transmitter and the ultrasound receiver are configured in parallel in the sensing device.

4. The material recognition system of claim 1, wherein the ultrasound transmitter and the ultrasound receiver are stuck flatly to the surface of the target object.

5. The material recognition system of claim 1, wherein a first sensing device is configured in a first side of the fetching part of the fetching device, and a second sensing device is configured in a second side of the fetching part of the fetching device.

6. The material recognition system of claim 1, wherein the sensing device further comprises a pressure sensor to determine whether the ultrasound transmitter and the ultrasound receiver have touched the surface of the target object.

7. The material recognition system of claim 1, wherein the fetching device is a robot arm, a chuck device, a probe device, or a gripper device.

8. A material recognition method, applied to a material recognition system, comprising:

fetching, by a fetching device of the material recognition system, a target object;

transmitting, by an ultrasound transmitter of at least one sensing device of the material recognition system, an ultrasound emitting signal on a surface of the target object;

receiving, by an ultrasound receiver of the at least one sensing device, an ultrasound received signal on the surface of the target object, wherein when the fetching device fetches the target object, the ultrasound transmitter and the ultrasound receiver touch the surface of the target object, and wherein there is a fixed distance between the ultrasound transmitter and the ultrasound receiver; and recognizing, by a processing device of the material recognition system, a material of the target object according to the ultrasound emitting signal, the ultrasound received signal, and the fixed distance, wherein the method further comprises:

obtaining, by the processing device, ultrasound transmission speed information according to the ultrasound emitting signal, the ultrasound received signal, and the fixed distance;

obtaining, by the processing device, time-domain information and frequency-domain information of the ultrasound emitting signal and the ultrasound received signal;

indicating, by the processing device, ultrasound features according to the time-domain information and the frequency-domain information of the ultrasound emitting signal and the ultrasound received signal;

inputting, by the processing device, the ultrasound transmission speed information and the ultrasound features corresponding to the time-domain information and the frequency-domain information into a machine learning model to recognize the material of the target object, wherein the ultrasound features comprise an impedance value, an attenuation value, a distortion value, and a complexity corresponding to the ultrasound emitting signal and the ultrasound received signal.

9. The material recognition method of claim 8, further comprising:

recognizing, by the processing device, the material of the target object according to the ultrasound transmission speed information and a look-up table.

10. The material recognition method of claim 8, wherein the ultrasound transmitter and the ultrasound receiver are configured in parallel in the sensing device.

11. The material recognition method of claim 8, wherein the ultrasound transmitter and the ultrasound receiver are stuck flatly to the surface of the target object.

12. The material recognition method of claim 8, wherein a first sensing device is configured in a first side of the fetching part of the fetching device, and a second sensing device is configured in a second side of the fetching part of the fetching device.

13. The material recognition method of claim 8, wherein the sensing device further comprises a pressure sensor to determine whether the ultrasound transmitter and the ultrasound receiver have touched the surface of the target object.

14. The material recognition method of claim 8, wherein the fetching device is a robot arm, a chuck device, a probe device, or a gripper device.

* * * * *